United States Patent
Khan

(10) Patent No.: US 6,606,611 B1
(45) Date of Patent: Aug. 12, 2003

(54) SYSTEM AND METHOD FOR AUDIO-ONLY INTERNET BROWSING USING A STANDARD TELEPHONE

(76) Inventor: Emdadur Khan, 5942 Foligno Way, San Jose, CA (US) 95138

(*) Notice: Subject to any disclaimer, the term of this patent is extended or adjusted under 35 U.S.C. 154(b) by 0 days.

(21) Appl. No.: 09/337,391

(22) Filed: Jun. 23, 1999

Related U.S. Application Data

(60) Provisional application No. 60/121,981, filed on Feb. 27, 1999.

(51) Int. Cl.[7] .............................................. G06F 9/455
(52) U.S. Cl. ....................................................... 706/10
(58) Field of Search ........................ 455/3.04; 434/350; 379/88.13; 704/270.1; 370/352, 219; 706/10

(56) References Cited

U.S. PATENT DOCUMENTS

| | | | | |
|---|---|---|---|---|
| 5,638,494 A | * | 6/1997 | Pinard et al. ................ 709/202 |
| 5,699,486 A | * | 12/1997 | Tullis et al. ............. 704/270.1 |
| 5,727,950 A | * | 3/1998 | Cook et al. .................. 434/350 |
| 5,754,939 A | * | 5/1998 | Herz et al. .................. 455/3.04 |
| 5,799,063 A | * | 8/1998 | Krane ...................... 379/88.17 |
| 5,835,087 A | * | 11/1998 | Herz et al. .................. 345/810 |
| 5,867,494 A | * | 2/1999 | Krishnaswamy et al. ... 370/352 |
| 5,867,495 A | * | 2/1999 | Elliott et al. ................. 370/352 |
| 5,884,262 A | * | 3/1999 | Wise et al. .............. 704/270.1 |
| 5,915,001 A | | 6/1999 | Uppaluru ................. 379/88.77 |
| 5,953,392 A | * | 9/1999 | Rhie et al. ................ 379/88.13 |
| 5,960,036 A | * | 9/1999 | Johnson et al. ............. 375/219 |
| 5,999,525 A | * | 12/1999 | Krishnaswamy et al. ... 370/352 |
| 6,157,935 A | | 12/2000 | Tran et al. |
| 6,185,535 B1 | | 2/2001 | Hedin et al. ................. 704/270 |
| 6,201,948 B1 | | 3/2001 | Cook et al. .................. 434/350 |
| 6,208,658 B1 | | 3/2001 | Pickett ....................... 370/395 |
| 6,209,036 B1 | | 3/2001 | Aldred et al. ................ 709/229 |
| 6,499,021 B1 | * | 12/2002 | Abu-Hakima ................ 706/10 |

FOREIGN PATENT DOCUMENTS

| | | | | |
|---|---|---|---|---|
| GB | 2307619 A | * | 5/1997 | ............. H04M/3/42 |
| GB | 2317070 | * | 3/1998 | ............. H04M/3/50 |
| GB | WO98/35491 | * | 8/1998 | ............. H04M/3/50 |

OTHER PUBLICATIONS

Pallakoff, Matt Talker Plug–In, MVP Solutions Inc.; http://www.mvpsolutions.com/plugInSite/Talker.html?text/x–speech.*

Microsoft Corporation, Telephony Application Programming Interface; http:/www.microsoft.com/ntserver/commserv/techdetails/prodarch/tapiwp.asp.*

McGregor, Rob, Using the Win32 Internet (Winlnet) API, http:/pbs.mcp.com/ebooks/1575211173/ch17.htm.*

(List continued on next page.)

Primary Examiner—Wilbert L. Starks, Jr.
Assistant Examiner—Michael B. Holmes
(74) Attorney, Agent, or Firm—Wildman Harrold Allen & Dixon

(57) ABSTRACT

A method and apparatus for accessing Internet using voice and audio instead of a conventional visual display. POTS (Plain Old Telephone Service) can be used to access the Internet by calling an "audio" ISP (Internet Service Provider) and interacting with an Intelligent Agent. An Audio ISP uses a standard telephone (POTS, digital or analog cellular telephone, PCS telephone, satellite telephone, etc.) instead of a modem, telephone line and traditional data ISP. The Intelligent Agent (IA) takes information from the caller, accesses the Internet, retrieves the desired information and reads it back to the caller using a voice signal. The IA can surf the net by responsively interacting with the caller using voice. The IA does not need a web browser. The IA does not require any change in the current world wide web data format to support audio. The IA works with the existing web data format. Users can also access email (both send and receive) by talking and listening through the IA using POTS.

31 Claims, 4 Drawing Sheets

OTHER PUBLICATIONS

David L. Atkins et al. "Integrated Web and Telephone Service Creation," Bell Labs Technical Journal, vol. 2, No. 1, Dec. 21, 1997, pp. 19–35.*

J.H. Page et al., "The Laureate Text–to–Speech System–Architecture an Applications," BT Technology Journal, vol. 14, No. 1, Jan. 1, 1996, pp. 57–67.*

"Surfing on the Web by Voice" Charles T. Hemphill & Phillip R. Thrift, ACM Multimedia 95—Electronic Proceedings, Nov. 5–9, 1995, San Francisco, California.*

"Voice Browsing the Web for Information Access" Rajeev Agarwal, Yeshwant Muthusamy, and Vishu Viswanathan, Media Technologies Lab, Texas Instruments Incorporated, Voice Browser Workshop Agenda, (Oct. 13, 1998).*

* cited by examiner

SYSTEM AND METHOD FOR AUDIO-ONLY INTERNET BROWSING USING A STANDARD TELEPHONE

RELATED APPLICATIONS

The present invention claims priority to Provisional Application No. 60/121,981 filed Feb. 27, 1999 and entitled INTERNET ACCESS USING REGULAR PHONE. This priority document is hereby incorporated herein by reference.

BACKGROUND OF THE INVENTION

1. Field of the Invention

The present invention relates to a method and apparatus for Internet access, and more particularly to accessing and navigating the Internet through the use of an audio interface via standard POTS (plain old telephone service).

2. Description of the Related Art

The number of Internet access methods has increased with the rapid growth of the Internet. World Wide Web (WWW) "surfing" has likewise increased in popularity. Surfing or "Internet surfing" is a term used by analogy to describe the ease with which a user can use the waves of information flowing around the Internet to find desired or useful information. The term surfing as used in this specification is intended to encompass all of the possible activities a user can participate in using the Internet. Beyond looking up a particular Internet resource or executing a search, surfing as used herein is intended to include playing video games, chatting with other users, composing web pages, reading email, applying for an online mortgage, trading stocks, paying taxes to the Internal Revenue Service, transferring funds via online banking, purchasing concert or airline tickets, etc. Various kinds of web browsers have been developed to facilitate Internet access and allow users to more easily surf the Internet. In a conventional web interface, a web browser (e.g. Netscape Navigator® which is part of Netscape Communicator® produced by Netscape Communications Corporation of Mountain View, Calif.) visually displays the contents of web pages and the user interacts with the browser visually via mouse clicking and keyboard commands. Thus, web surfing using conventional web browsers requires a computer or some other an Internet access appliance such as a WB-2001 WebTV® Plus Receiver produced by Mitsubishi Digital Electronics America, Inc. of Irvine, Calif.

Recently, some web browsers have added a voice based web interface in a desktop environment. In such a system, a user can verbally control the visual web browser and thus surf the Internet. The web data is read to the user by the browser. However, this method of Internet access is not completely controllable by voice commands alone. Users typically must use a mouse or a keyboard to input commands and the browser only reads the parts of the web page selected using the mouse or the keyboard. In other words, existing browsers that do allow some degree of voice control still must rely on the user and visual displays to operate. In addition, these browsers require that the web data to be read aloud must be formatted in a specific way (e.g. the shareware Talker Plug-In written by Matt Pallakoff and produced by MVP Solutions Inc. of Mountain View, Calif. can be used with Netscape Commerce Server and uses files formatted in accordance with a file format identified by the extension ".talk" (see i.e. http://www.mvpsolutions.com/PlugInSite/Talker.html which was printed on Jun. 22, 1999 and is incorporated herein by reference.)

Some commercially available products (e.g. Dragon Dictate® from Dragon Systems Inc. of Newton, Mass.) can read a web page as displayed on a conventional browser in the standard web data format, however, the particular portion of the page to be read must be selected by the user either via mouse or voice commands. A critical limitation of these systems is that they require the user to visually examine the web data and make a selection before any web data to speech conversion can be made. This limitation also exists when using these systems to surf the web. The user needs to look at the browser and visually identify the desired Uniform Resource Locator (URL) (or use a predetermined stored list of URLs) and then select the desired URL by voice commands. What is needed is a means to access and surf the Internet that does not rely upon the user being able to visually perceive web data. What is further needed is a system for "audio-only" access to the Internet that does not require the authors of web pages to provide web data in specialized formats for audio play-back.

SUMMARY OF THE INVENTION

In view of the background discussed above, it is an object of the present invention to provide an improved web browser interface that: does not require the use of a computer or other Internet appliance, thus making Internet access significantly simpler by using a ubiquitous device like POTS; can interact with the user completely through audio signals using voice recognition and web data to speech conversion (i.e., without any need to visually perceive web pages); and allow the use of a conventional visual browser component but with a more intelligent interface that permits audio-only control and feedback (i.e., looking at the browser is optional). Another object of the present invention is to bring Internet access to the masses of people who either cannot afford a computer or lack computer training but can use the ubiquitous POTS. Thus, the present invention allows Internet browsing without requiring the substantial cost of owning and operating a computer or Internet access appliance.

In addition, since the present invention allows a user to browse the Internet with voice only, the user is thus enabled to do so while his eyes and/or hands are otherwise occupied (e.g., while driving, walking, or operating machinery). Another object of the present invention is to facilitate audio-only web browsing using web data as currently formatted (i.e., the present invention does not require a change to the existing web server data format to support audio-only browsing). Another object of the present invention is to allow access to email using POTS.

Thus the present invention provides a method of browsing the Internet comprising the steps of establishing bi-directional voice communication link with an audio Internet service provider, speaking a web surfing voice command over the bi-directional voice communication link, and then the audio Internet service provider generating a voice response representative of a World Wide Web page corresponding to the web surfing voice command. The step of generating a voice response includes the steps of translating the spoken web surfing voice command into a conventional web browser command using a speech recognition unit, retrieving Internet data responsive to the conventional web browser command, identifying portions of the Internet data useful to create an audio representation of the Internet data, and translating the identified Internet data into a computer-generated voice signal.

The present invention further includes a system for browsing the Internet comprising a telephone and an audio Internet service provider coupled to the telephone. The audio Internet service provider includes a data Internet service provider coupled to an apparatus operable to perform a selective translation function, wherein the apparatus selectively translates between voice signals and Internet data signals. The voice signals include spoken language and the internet data signals include World Wide Web pages. The apparatus operable to perform a selective translation function includes an intelligent agent that includes a speech recognition engine (SRE), a text to speech conversion engine (TTS), an understanding unit (UU) for interpreting the voice signals and processing the Internet data signals, and a transaction processing unit (TPU).

These and other features and advantages of the present invention will be understood upon consideration of the following detailed description of the invention and the accompanying drawings.

DETAILED DESCRIPTION OF THE INVENTION

The present invention is preferably embodied as a computer program developed using an object oriented language that allows the modeling of complex systems with modular objects to create abstractions that are representative of real world, physical objects and their interrelationships. However, it would be understood by one of ordinary skill in the art that the invention as described herein can be implemented in many different ways using a wide range of programming techniques as well as general purpose hardware systems or dedicated controllers.

The present invention relates to accessing the Internet using only voice and audio instead of conventional visual inputs and displays. A POTS (plain old telephone service) is used to access the Internet by calling an "audio" ISP (Internet service provider). An audio ISP includes a conventional data ISP that is buffered by an apparatus capable of performing a selective translation function using artificial intelligence methods. In the preferred embodiment of the present invention, this selective translation function is performed by an apparatus called an Intelligent Agent (IA) which is described in detail below. The IA translates Internet data into spoken language as well as translating spoken data and commands into Internet web surfing commands. An audio ISP uses a standard telephone (POTS, digital or analog cellular telephone, PCS telephone, satellite telephone, etc.) instead of a modem, telephone line and a direct connection to a conventional data ISP. An audio ISP uses TAPI (telephony application programming interface) or a similar protocol to connect a standard telephone to a computer or other Internet appliance. The IA takes information from the caller in the form of voice commands, accesses the Internet, retrieves the desired information, and reads it back to the caller using voice. Using voice input and output signals only, the caller can surf the net by interacting with the IA. The IA eliminates the need for a conventional visual web browser.

Figure 1:
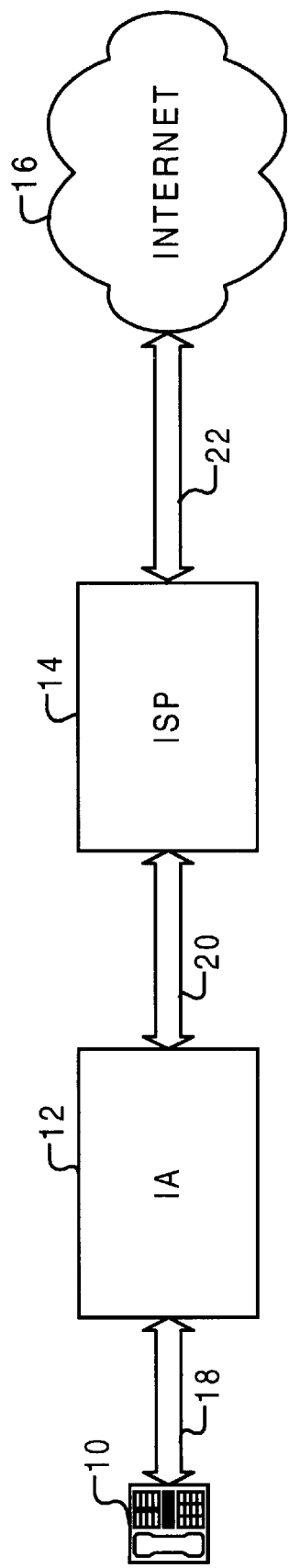
FIG. 1 depicts a high level block diagram of an example embodiment of a system for accessing the Internet using a standard telephone in accordance with the present invention.

Turning now to FIG. 1, an intelligent agent (IA) 12 allows a user, via a standard telephone 10, to communicate with the Internet 16 through a conventional ISP 14. In accordance with the present invention, the IA 12 receives voice input signals 18 from the user via the telephone 10. One of ordinary skill in the art would recognize that any number of audio-only-based bi-directional communication systems could be used in place of the standard telephone 10 including digital or analog cellular telephones, PCS telephones, satellite telephones, two-way radios, etc. The IA 12 initiates an Internet session by providing a signal 20 to a conventional ISP 14. The IA 12 can connect to the conventional ISP 14 using any number of well known methods including the use of dial-up modems, cable modems, Digital Subscriber Lines, Integrated Services Digital Networks, T1/T3 lines, Asynchronous Transfer Mode lines, local area network, high speed bus, etc. The conventional ISP generates an output signal 22 to access the Internet 16 as is known in the art. A web page from the Internet 16 is sent to the IA 12 via the conventional ISP 14. The IA 12 interprets the contents of the web page and determines which parts of the web page that need to be converted from text to speech (TTS), text table to speech, graphics to speech (GTS), or graphics to text to speech (GUTS using Optical Character Recognition (OCR) and then TTS). The IA 12 then converts the selected parts of the page to speech and sends a signal 18 containing the speech to the user via the telephone 10. The user via the telephone 10 can continue to request other URLs. In addition, the user can interact with web pages such as search engines to locate a desired URL. The IA 12 repeats the process of getting the new web page and sending back an audio-only version to the user via the telephone 10 using, for example, a standard telephone line.

The IA 12 is configurable to provide a user-selectable level of detail in the audio-only version of a retrieved web page. Thus, for example, a web page containing a list of matching URLs generated by a search engine in response to a query could be read to the user in complete detail or in summary form.

Figure 2:
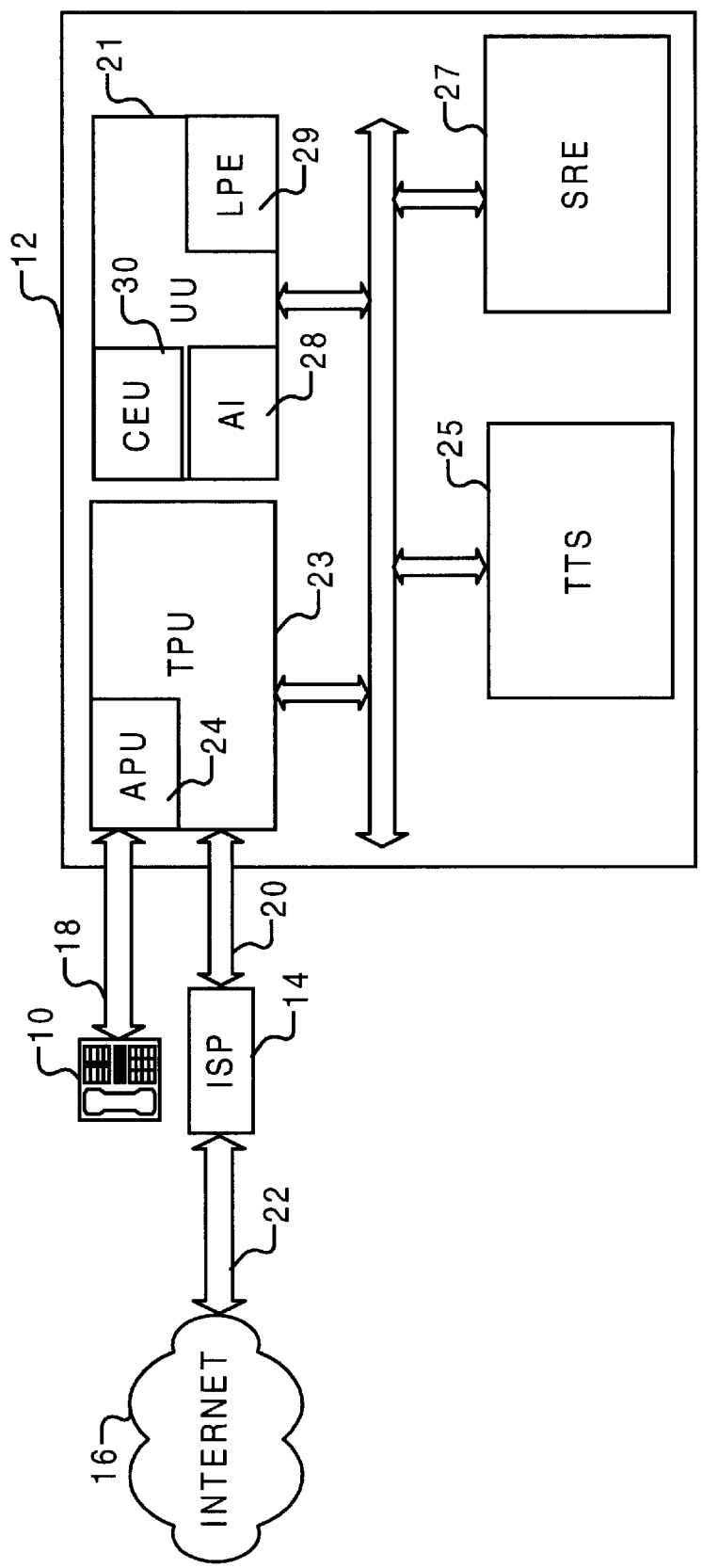
FIG. 2 depicts a block diagram of an example embodiment of an intelligent agent (IA) component of the system depicted in FIG. 1 in accordance with the present invention.

Referring now to FIG. 2, the IA 12 of FIG. 1 is described. The IA 12 provides an intelligent interface between the user on the telephone 10 and the Internet 16. In a basic preferred embodiment, the IA 12 includes a speech recognition engine (SRE) 27, a text to speech conversion engine (TTS) 25, an understanding unit (UU) 21 that understands both the contents of the web page and the user's spoken voice, and a transaction processing unit (TPU) 23. While these components of the IA 12 are depicted as individual hardware circuits coupled together via a single bus, one of ordinary skill in the art would understand that many different hardware architectures could be used and likewise, the entire IA 12 (or parts of it) could be implemented as software operable to run on a general purpose computer or even another data processing device.

The TPU 23 communicates with the user via the telephone 10 and the Internet 16 using signals 18 and 20. The users' telephone calls are answered by the answer phone unit (APU) 24 which is preferably embodied as a telephone card or modem and is part of the TPU 23. The TPU 23 communicates with the user via the telephone 10 using, for example, the TAPI standard, a protocol developed by Microsoft Corporation of Redmond, WA that is used in connecting a telephone with a computer over a standard telephone line (see http://www.microsoft.com/ntserver/commserv/techdetails/prodarch/tapiwp.asp which was printed on Jun. 22, 1999 and is incorporated herein by reference). In a preferred embodiment, the TPU 23 communicates with the Internet 16 via the conventional data ISP 14 using: a modem and a telephone line; a cable modem and a cable line; or an Ethernet connection as is known in the art. Thus, the IA 12 integrates a TAPI-based audio ISP with conventional data ISP using a modem or Ethernet connection.

The UU 21 is preferably implemented as a programmed computer processor including the normally associated memory and interface ports as is well known in the art. The UU 21 is operative to determine what part of a web page is graphics, what part is a dynamic advertisement, what part is an interactive program, which text is a link to a URL, etc. and makes decisions accordingly. The UU 21 is also equipped with means to understand a user's commands. The UU 21 uses a language processing engine (LPE) 29 to interpret multiple words received from the user. The UU 21 uses an artificial intelligence (AI) unit 28 that includes one or more expert systems, probabilistic reasoning systems, neural networks, fuzzy logic systems, genetic algorithm systems, and combinations of these systems and other systems based on other AI technologies (e.g., soft computing systems). In order to understand the users' commands, the UU 21 uses the SRE 27 to convert users' commands to text. Before sending the web page text to the user via the telephone 10, the UU 21 selectively converts text to speech using the TTS unit 25. The UU 21 allows the user to interact with Internet web pages by creating a complete audio representation of the web pages. Thus, if a web page includes a dynamic program such as a Java program to calculate a mortgage payment for example, the UU 21 would execute the program within the IA 12 and describe the display that would have been generated by a conventional visual browser. The IA 12 can also use the UU 21 to identify and interpret audio formatted data, including audio hypertext mark up language (HTML) tags.

The UU 21 also includes a client emulation unit (CEU) 30 that allows the UU 21 to execute web client type programs such as Java and Java script programs that would normally execute on a user's client computer. The CEU 30 can spawn a virtual machine (e.g., a Microsoft Windows NT window), execute the client program to generate the associated displays, and pass the display data to the UU 21 to be translated and relayed to the user as described above. In this way, users are able to execute and interact with web pages that include executable programs.

Figure 3:
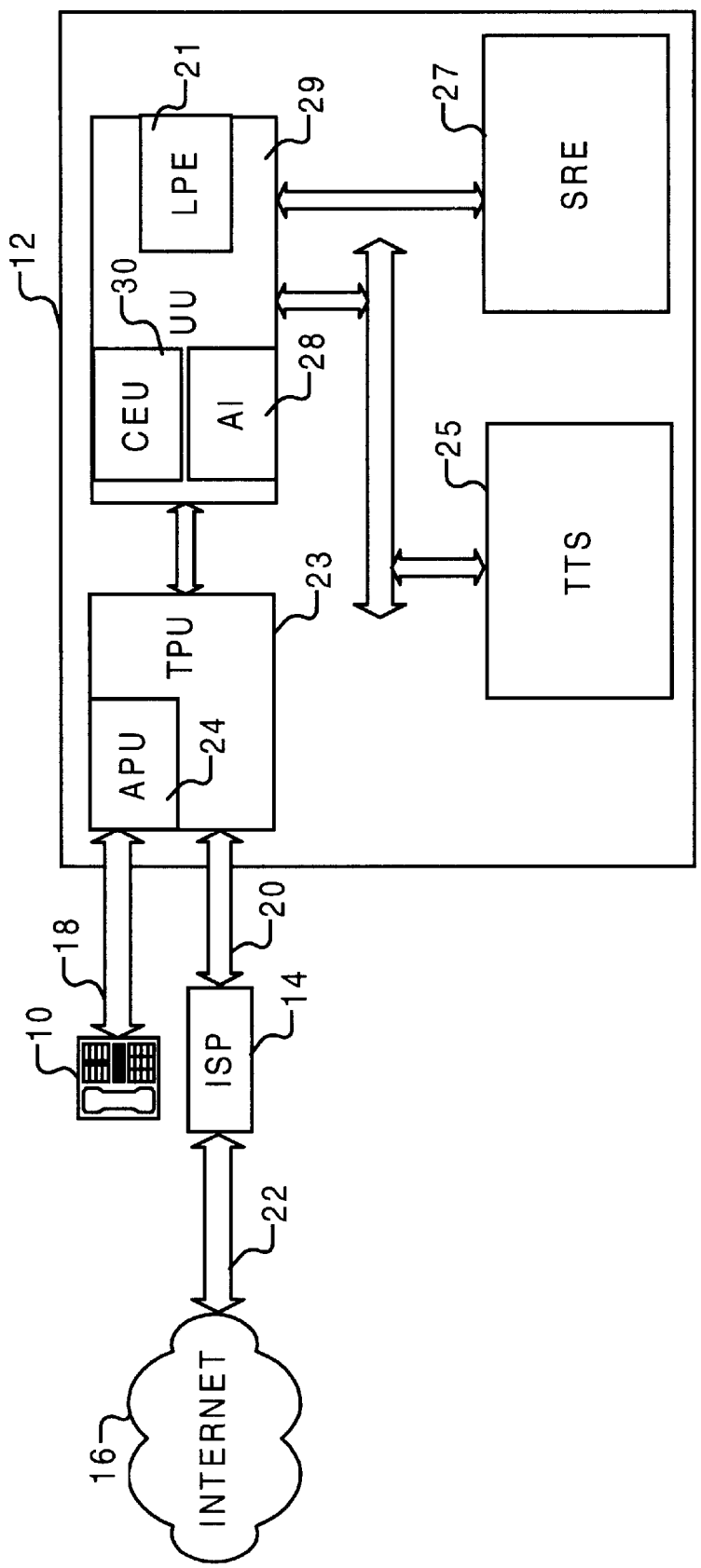
FIG. 3 depicts a block diagram of a second example embodiment of an intelligent agent (IA) component of the system depicted in FIG. 1 in accordance with the present invention.

FIG. 3 depicts an alternate architecture for the IA 12. The individual functional components of the IA 12 are identical to those described in FIG. 2 and as such the components are identified using the same reference numerals. The embodiment of FIG. 3 however provides a preferred arrangement for the functional components that allows a more optimized operation.

Figure 4:
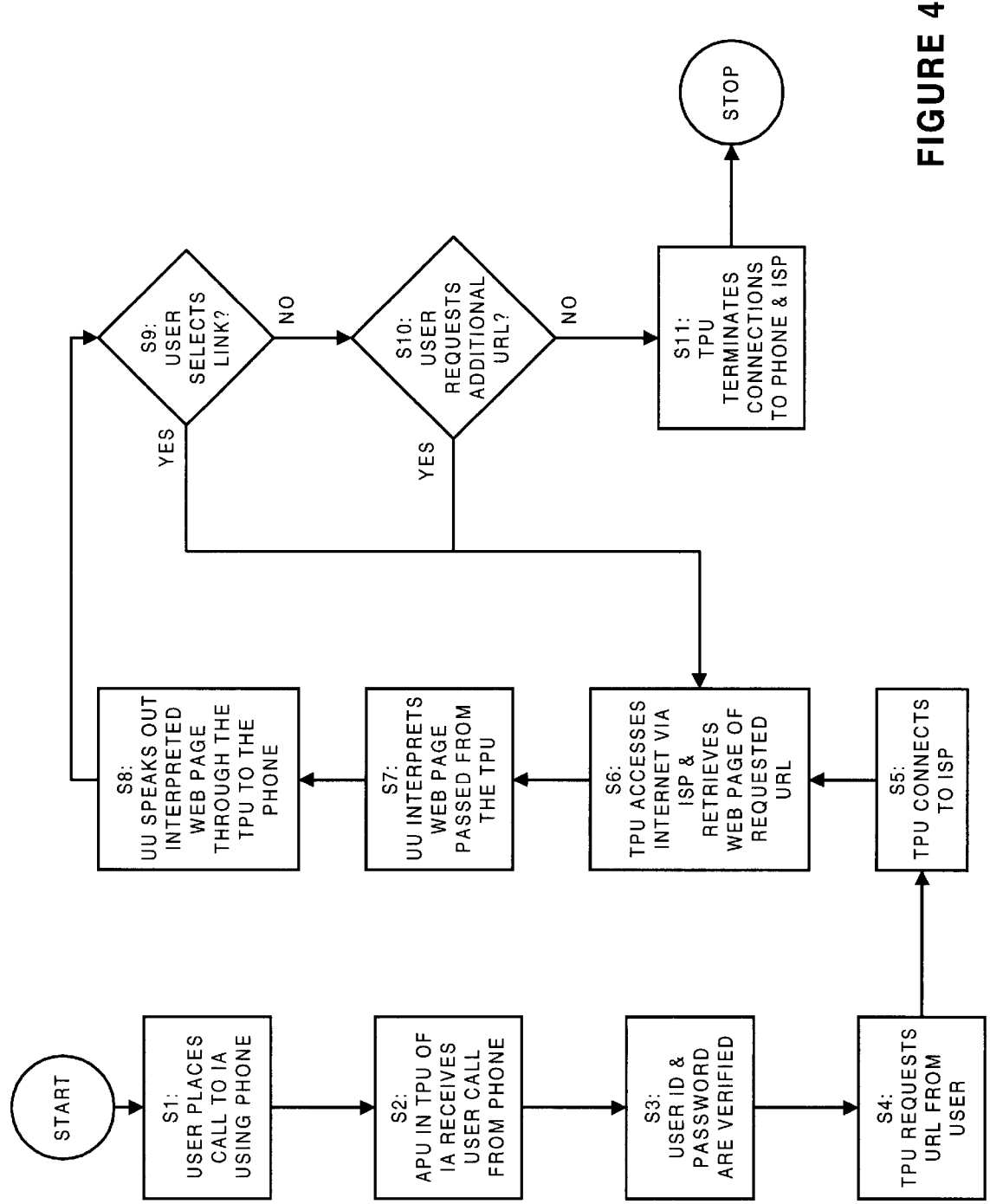
FIG. 4 illustrates an example embodiment of a method of accessing the Internet using a standard telephone in accordance with the present invention.

Turning now to FIG. 4, a flow chart depicting an example audio-only web browsing transaction using the systems illustrated in FIGS. 1, 2 and 3 is described. In steps S1 and S2, a user's telephone call to the IA 12 is answered by the APU 24 within the TPU 23 as depicted in FIG. 2. After checking the user's identification and password in step S3, the TPU 23 asks the user for a URL to access in step S4. A connection to the conventional ISP 14 is then created in step S5 using the TPU 23. After accessing the Internet and receiving the web page in step S6, the web page is interpreted by the UU 21 in step S7. In step S8, the UU 21 speaks out the appropriate text of the web page to the user via the telephone 10. Processing steps S6 through S8 are repeated until the user discontinues selecting links to new URLs in decision step S9 and stops requesting additional URLs in decision step S10. At that point, the TPU 23 terminates the connections to both the telephone 10 and the Internet 16.

In a preferred embodiment, the IA 12 is implemented in software and executed on a server computer. It is important to note that a user does not need a conventional visual browser because the IA 12 effectively provides an audio ISP. However, the audio ISP can be implemented using a conventional visual web browser in conjunction with the IA 12. Alternatively, an audio ISP can use other means of accessing and retrieving web pages such as the Win32 Internet (WinInet) Application Programming Interface (API) as developed by Microsoft Corporation, described at http://pbs.mcp.com/ebooks/1575211173/ch17.htm, printed on Jun. 22, 1999 and hereby incorporated herein by reference. One of ordinary skill in the art would further understand that the IA 12 can also be used to access, manage, compose, and send email. In other words, a user can send or receive email using voice only working through the IA 12. Thus, a user can surf the web and can exploit all of the capabilities of the Internet, simply through human voice commands and computer generated-voice responses instead of using a visual browser running on a computer or other Internet appliance.

While the method and apparatus of the present invention has been described in terms of its presently preferred and alternate embodiments, those skilled in the art will recognize that the present invention may be practiced with modification and alteration within the spirit and scope of the appended claims. The specifications and drawings are, accordingly, to be regarded in an illustrative rather than a restrictive sense.

Further, even though only certain embodiments have been described in detail, those having ordinary skill in the art will certainly understand that many modifications are possible without departing from the teachings thereof. All such modifications are intended to be encompassed within the following claims.

What is claimed is:

1. A system for browsing the Internet comprising:

a telephone; and an audio Internet service provider coupled to the telephone and providing bi-directional voice communication with a user of the telephone, wherein an aural command from a user of the telephone is converted to an Internet address for accessing and retrieving textual content from a World Wide Web page corresponding to such Internet address, and at least a portion of such textual content is converted to an aural response to the user.

2. The system of claim 1 wherein the audio Internet service provider includes a data Internet service provider coupled to an apparatus operable to perform a selective translation function, wherein the apparatus selectively translates between voice signals and Internet data signals.

3. The system of claim 2 wherein the voice signals include spoken language and is the internet data signals include World Wide Web pages.

4. The system of claim 2 wherein the apparatus operable to perform a selective translation function includes an intelligent agent.

5. The system of claim 4 wherein the intelligent agent includes a t least one of a speech recognition engine (SRE), a text to speech conversion engine (UTS), an understanding unit (UU) for interpreting the voice signals and processing the Internet data signals, and a transaction processing unit (TPU).

6. The system of claim 5 wherein the UU includes a language processing engine (LPE) and an artificial intelligence (AI) unit.

7. The system of claim 5 wherein the TPU includes an answer phone unit (APU).

8. A system for browsing the Internet comprising:
means for bi-directional voice communication; and
means for providing audio Internet service coupled to and providing bi-directional voice communication with the means for bi-directional voice communication, wherein an aural command received via the means for bi-directional voice communication is converted to an Internet address for accessing and retrieving textual content from a World Wide Web page corresponding to such Internet address, and at least a portion of such textual content is converted to an aural response for transmission via the means for bi-directional voice communication.

9. The system of claim 8 wherein the means for providing audio Internet service includes means for providing data Internet service coupled to means for performing a selective translation function, wherein the means for performing a selective translation function is operable to selectively translate between voice signals and Internet data signals.

10. The system of claim 9 wherein the voice signals include spoken language and the internet data signals include World Wide Web pages.

11. The system of claim 9 wherein the means for performing a selective translation function includes at least one of means for performing speech recognition, means for converting text to speech, means for interpreting the voice signals and processing the Internet data signals, and means for processing user Internet surfing transactions.

12. The system of claim 11 wherein the means for interpreting the voice signals and processing the Internet data signals includes means for processing spoken language and means for applying artificial intelligence to determine how to represent and interact with a web page using only an audio signal.

13. The system of claim 11 wherein the means for processing user Internet surfing transactions includes means for responding to the initialization of a bi-directional voice communication.

14. A method of browsing the Internet comprising the steps of:
establishing a bi-directional voice communication link with an audio Internet service provider;
transmitting a voice signal including a web surfing voice command over the bi-directional voice communication link; and
generating, by the audio Internet service provider, a voice response signal representative of an Internet data signal, the Internet data signal including a World Wide Web page corresponding to the web surfing voice command, wherein the web surfing command is converted to an Internet address for accessing and retrieving textual content from such World Wide Web page, and at least a portion of such textual content is converted to such voice response signal.

15. The method of claim 14 wherein the step of generating includes the step of:
performing a selective translation function to selectively translate between the voice signal and the Internet data signal.

16. The method of claim 15 wherein the step of performing a selective translation function includes the steps of:
interpreting the voice signal to identify a portion containing the web surfing voice command;
performing speech recognition on the identified portion of the voice signal to determine the web surfing voice command;
executing the web surfing voice command and receiving the Internet data signal in response;
processing the Internet data signal to determine a set of user options;
selecting text from the Internet data representative of the set of user options; and
converting the selected text to speech.

17. The method of claim 16 wherein the step of processing the Internet data signal includes the step of applying artificial intelligence to determine how to represent and interact with a web page using only an audio signal, and
wherein the step of interpreting the voice signal includes the step of applying artificial intelligence to identify the portion containing the web surfing voice command.

18. The method of claim 16 wherein the step of processing the Internet data signal includes the step of applying artificial intelligence to determine how to represent and interact with a web page using only an audio signal, and
wherein the step of performing speech recognition includes the step of applying artificial intelligence to determine the web surfing voice command.

19. The method of claim 14 wherein the step of establishing bi-directional voice communication link includes the step of responding to the initialization of a bi-directional voice communication.

20. The method of claim 14 wherein the step of generating includes the steps of:
translating the voice signal into a conventional web browser command using a speech recognition unit;
retrieving Internet data responsive to the conventional web browser command;
identifying portions of the Internet data useful to create an audio representation of the Internet data; and
translating the identified Internet data into a computer generated voice signal.

21. The method of claim 20 wherein the step of translating the voice signal includes translating a spoken email program voice control command and data, and
wherein the step of translating the identified Internet data includes the step of translating an email message into a computer generated voice signal.

22. The method of claim 20 wherein the step of translating the identified Internet data into a computer generated voice signal is performed by at least one of a text to speech converter, a graphics to speech converter, and a text table to speech converter.

23. A computer accessible medium including a computer executable program, the program implementing a method comprising the steps of:
establishing a bi-directional voice communication link between a user and an audio Internet service provider;
receiving a voice signal including a web surfing voice command over the bi-directional voice communication link; and
generating, by the audio Internet service provider, a voice response signal representative of an Internet data signal, the Internet data signal including a World Wide Web page corresponding to the web surfing voice command, wherein the web surfing command is converted to an Internet address for accessing and retrieving textual content from such World Wide Web page, and at least a portion of such textual content is converted to such voice response signal.

24. The method of claim 23 wherein the step of generating includes the step of:

performing a selective translation function to selectively translate between the voice signal and the Internet data signal.

25. The method of claim 24 wherein the step of performing a selective translation function includes the steps of:

interpreting the voice signal to identify a portion containing the web surfing voice command;

performing speech recognition on the identified portion of the voice signal to determine the web surfing voice command;

executing the web surfing voice command and receiving the Internet data signal in response;

processing the Internet data signal to determine a set of user options;

selecting text from the Internet data representative of the set of user options; and converting the selected text to speech.

26. The method of claim 25 wherein the step of processing the Internet data signal includes the step of applying artificial intelligence to determine how to represent and interact with a web page using only an audio signal, and wherein the step of interpreting the voice signal includes the step of applying artificial intelligence.

27. The method of claim 25 wherein the step of processing the Internet data signal includes the step of applying artificial intelligence to determine how to represent and interact with a web page using only an audio signal, and wherein the step of performing speech recognition includes the step of applying artificial intelligence.

28. The method of claim 23 wherein the step of establishing bi-directional voice communication link includes the step of responding to the initialization of a bi-directional voice communication.

29. The method of claim 23 wherein the step of generating includes the steps of:

translating the web surfing voice command into a conventional web browser command using a speech recognition unit;

retrieving Internet data responsive to the conventional web browser command;

identifying portions of the Internet data useful to create an audio representation of the Internet data; and translating the identified Internet data into a computer generated voice signal.

30. The method of claim 29 wherein the step of translating the web surfing voice command includes translating a spoken email program voice control command and data, and wherein the step of translating the identified Internet data includes the step of translating an email message into a computer generated voice signal.

31. The method of claim 29 wherein the step of translating the identified Internet data into a computer generated voice signal is performed by at least one of a text to speech converter, a graphics to speech converter, and a text table to speech converter.

* * * * *

UNITED STATES PATENT AND TRADEMARK OFFICE
CERTIFICATE OF CORRECTION

PATENT NO. : 6,606,611 B1
DATED : August 12, 2003
INVENTOR(S) : Emadadur Khan

It is certified that error appears in the above-identified patent and that said Letters Patent is hereby corrected as shown below:

Column 6,
Line 67, please delete "(UTS)" and replace with the following: -- (TTS) --

Signed and Sealed this

Twenty-third Day of September, 2003

JAMES E. ROGAN
*Director of the United States Patent and Trademark Office*